United States Patent
Ragland et al.

[19]

[11] Patent Number: 6,104,004
[45] Date of Patent: Aug. 15, 2000

[54] ELECTRIC BARBECUE GRILL

[75] Inventors: Scott W. Ragland, Alpharetta; Matthew S. Remke, Atlanta; J. Bradley Pearce, Snellville, all of Ga.

[73] Assignee: ATD Corporation, St. Louis, Mo.

[21] Appl. No.: 09/001,372

[22] Filed: Dec. 31, 1997

[51] Int. Cl.[7] ................................................. A47J 37/07
[52] U.S. Cl. ................... 219/405; 219/386; 219/450.1; 99/25 R; 99/450
[58] Field of Search ............................. 219/405, 411, 219/385, 386; 99/390, 391, 401, 419–421 V, 447, 450; 126/41 R–41 B, 25 R, 25 A, 19 R, 9 R, 214 D; 392/422, 423, 430, 431

[56] References Cited

U.S. PATENT DOCUMENTS

| | | | |
|---|---|---|---|
| 1,051,503 | 1/1913 | Klein | 99/401 |
| 3,424,145 | 1/1969 | Stitt | 126/25 R |
| 3,527,154 | 9/1970 | Shaper et al. . | |
| 3,712,285 | 1/1973 | Copeland | 126/9 R |
| 3,732,803 | 5/1973 | Buxmann | 99/401 |
| 3,959,620 | 5/1976 | Stephan | 219/386 |
| 4,034,663 | 7/1977 | Jenn et al. . | |
| 4,418,678 | 12/1983 | Erickson | 126/9 R |
| 4,434,781 | 3/1984 | Koziol | 126/25 R |
| 4,535,753 | 8/1985 | Zayauskas | 126/9 R |
| 4,683,864 | 8/1987 | Beatty | 126/41 B |
| 5,011,743 | 4/1991 | Sheridan et al. . | |
| 5,156,140 | 10/1992 | Zisman | 126/41 R |
| 5,176,067 | 1/1993 | Higgins | 99/401 |
| 5,197,379 | 3/1993 | Leonard, Jr. . | |
| 5,406,930 | 4/1995 | Ragland et al. . | |
| 5,524,406 | 6/1996 | Ragland | 52/745.19 |
| 5,582,094 | 12/1996 | Peterson et al. | 99/450 |
| 5,763,857 | 6/1998 | Klement et al. | 219/405 |

FOREIGN PATENT DOCUMENTS

| | | |
|---|---|---|
| 9 132 364 A2 | 1/1985 | European Pat. Off. . |
| 26 12 380 A2 | 9/1977 | Germany . |
| 41 36 088 A1 | 4/1992 | Germany . |
| 684 383 A5 | 9/1994 | Switzerland . |
| 737331 | 9/1955 | United Kingdom . |
| 1403861 | 8/1975 | United Kingdom . |
| 2 143 633 | 2/1985 | United Kingdom . |
| WO 95/04901 | 2/1995 | WIPO . |

*Primary Examiner*—Joseph Pelham
*Attorney, Agent, or Firm*—Burns Doane Swecker and Mathis, LLP

[57] ABSTRACT

The invention provides a grill configuration which enables a 2400 Watt or smaller electric heating element to provide cooking temperatures of at least 500° F. when food is present on a grill area of at least 200 square inches. The electric grill includes an electric heating element and a multilayer metal sheet insert shaped to reflect radiation heat from the heating element to impinge on the food present on the grill surface. The multilayer metal sheet insert is preferably metal foil layers which provide maximum insulation and heat containment to increase the efficiency of the limited heat available from the electric heating element of the grill.

21 Claims, 2 Drawing Sheets

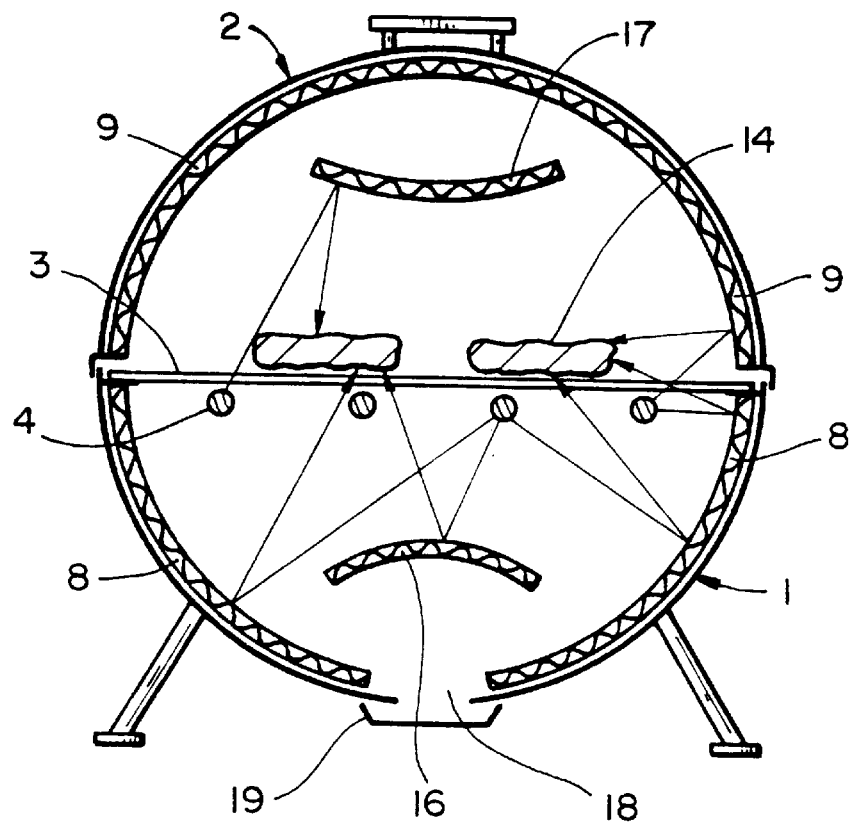
FIG_1
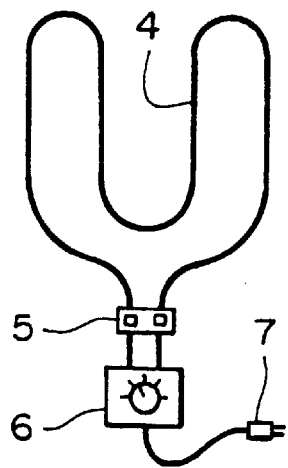
FIG_2a
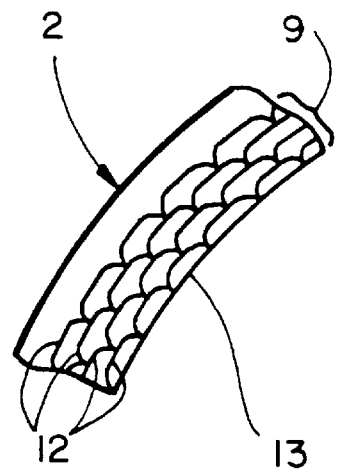
FIG_2b

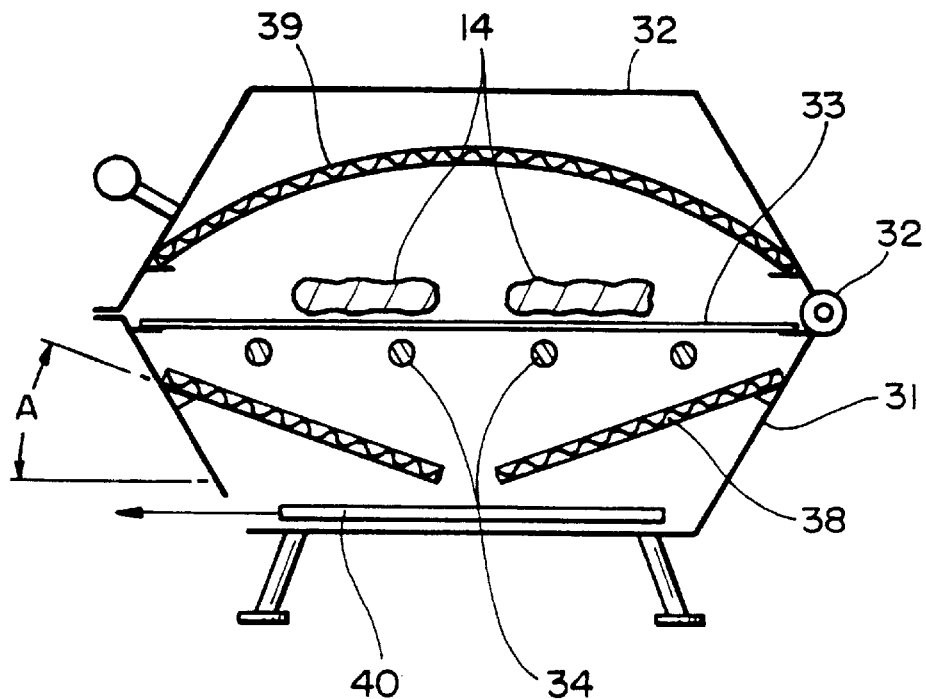
FIG_3
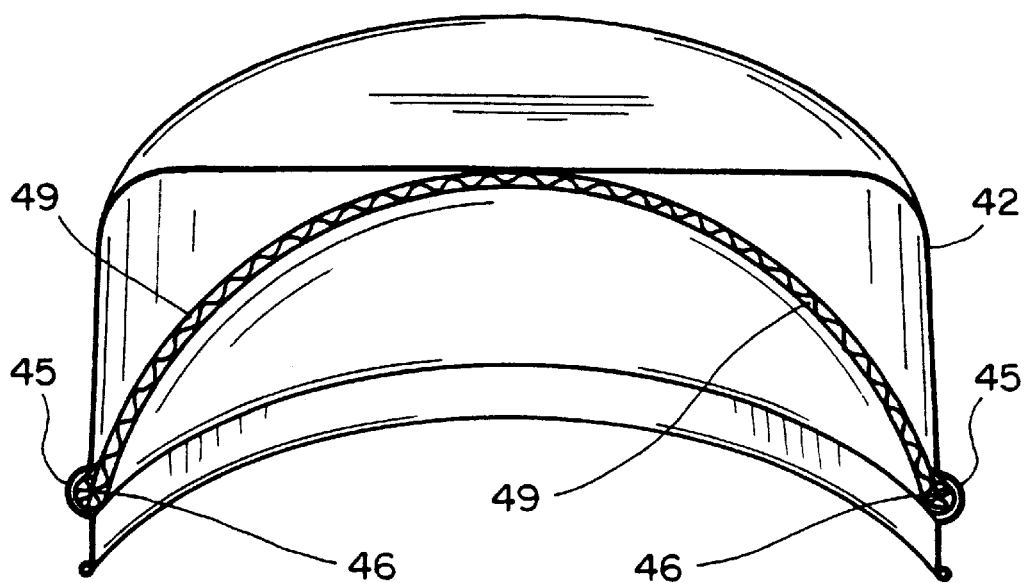
FIG_4

ELECTRIC BARBECUE GRILL

FIELD OF THE INVENTION

This invention relates to improvements in electric cooking grills and in particular to electric household grills which operate in the United States on 110–120 volt AC and generally limited to a 15 amp residential household circuit.

BACKGROUND OF THE INVENTION

Portable electric grills for residential use in the United States are by necessity 110–120 volt AC appliances limited by residential circuit to 1800 Watts, and in Europe they operate on 220 volts AC but are similarly limited to 2200 or 2400 Watts on a residential or house circuit. Consequently, the power available for the heating element in a portable electric grill is frequently limited to the 1350 to 1650 Watt range. It has long been recognized that the heat produced by a 1650 Watt or 1800 Watt heating element is inadequate to provide high temperature grill cooking over a large grill area. If the grill area is too large for such a heating element, sufficiently high temperatures, which generally need to be in the 500° F. to 600° F. range for effective grilling when food is present in a usual amount, cannot be achieved. When inadequate temperatures are produced in an electric grill, there is nonuniform distribution of heat across the cooking surface and inadequate smoking of the food. In those circumstances, the grill does not produce the desired grilled cooking flavors.

In efforts to solve the above problems in portable electric grills, some grills have been limited in size to as small as 100 square inches for table top models and to about 180 square inches for stand alone models. However, it is desirable to have a cooking grill surface larger than 200 square inches, preferably 225 square inches which is a size more customary and acceptable to consumers. Another effort to resolve the above problems with portable electric grills is illustrated in U.S. Pat. No. 3,527,154 wherein the proposed solution involved placing the heating element very close to the food being cooked and having a reflecting pan underneath and very close to the bottom of the heating element. Such attempted solutions are either unacceptable or are not sufficiently effective to provide a viable commercial product.

It is apparent that there is a need for improved efficiency of portable residential electric grills to enable the electric grills to provide acceptable grill cooking of food.

SUMMARY OF THE INVENTION

An object of this invention is to provide a grill configuration which will enable an 1800 Watt or smaller heating element to provide cooking temperatures of at least 500° F. to 600° F. range when food is present over a grill area of at least 225 square inches. This invention also provides additional benefits of enabling the grill to achieve higher temperatures of 650–850° F. which can provide a self-cleaning function when food is not present. This invention also enables 2400 Watt or 2200 Watt grills to achieve higher cooking temperatures and more uniform cooking. These objectives and other benefits enumerated herein are achieved by the present invention.

The present invention comprises, in one aspect, an electric grill having a housing with a movable or removable top or cover, an electric heating element in the bottom portion of the grill underneath the grill surface, a control switch for powering the heating element and a multilayer metal foil member fitted inside the top or cover wherein the multilayer metal foil insert member is shaped to reflect radiation heat from the heating element to impinge on the food present on the grill surface. Preferably, the multilayer metal foil insert member in the cover is made of aluminum foil which has a high reflectivity of radiated heat. It will be apparent that other metal foils may be selected for use in this invention depending on the degree of reflectivity of a particular wavelength radiation available from the heating element. The multilayer metal foil insert also provides efficient insulation and heat containment to increase the efficiency of the limited heat available from the heating element of the electric grill. Preferably, the control switch is a variable power control switch.

In another aspect, this invention further comprises an additional multilayer metal foil insert member positioned underneath the heating element inside the lower portion of the electric grill housing. The multilayer metal foil insert member in the lower portion of the grill has the similar functions of reflecting the radiated heat toward the food present on the grill surface and of insulating the grill to increase its efficiency by containing the limited amount of heat available from the heating element. The multilayer metal foil inserts in the lower portion of the grill further contribute to raising the temperature inside the grill during food cooking and during a self-cleaning cycle when no food is present.

Also preferred in this invention is to provide the multilayer metal foil insert in the lower portion of the grill with suitable surface and angle of installation to provide a path for grease drippings from cooking food first to impinge on the hot surface to provide for smoking when the grill temperature is sufficiently high and second to direct the excess grease drippings to a collection point when the temperature is not sufficiently high for smoking or vaporizing all of the grease drippings.

It is preferred that the multilayer metal foil insert member in the cover and the insert member in the bottom of the grill be shaped to appropriately reflect and focus the radiated heat toward the grill surface where the food is positioned. This can conveniently be provided whether the cover and base are dome or kettle shaped or whether they are more rectangular or barn roof shaped type of grill. An advantage of the multilayer metal foil insert members according to this invention, is that they need not conform to or contact the inside surface area of the cover of the grill or the inside surface area of the bottom of the grill. The insert member is preferably shaped as appropriate to provide for optimum reflection of radiation of heat from the heating element to focus the reflected radiation on the grill surface and to provide for best insulation for containment of heat within the grill. This may result in the insert member being in contact with or substantially shaped like the cover or bottom of the grill or may result in the insert member being positioned so that there is a standoff distance of varying degree between the insert member and the inside surfaces of the cover or bottom portion of the grill.

Another preferred aspect of this invention provides the multilayer metal foil insert members as removable, disposable, replaceable members constructed so that they can be installed in and removed from the grill by the consumer. The insert member can thereby be designed as appropriate as a single piece insert, for example for the cover it can be designed as a snap in single piece member as illustrated herein, or the bottom of the grill, it or can be designed to be inserted in sections as necessary. A sectioned insert is particularly desired if the overall grill design makes it impractical to remove the heating element when removing and replacing the multilayer metal foil insert member.

BRIEF DESCRIPTION OF THE DRAWINGS

The invention will now be described in greater detail with reference to the preferred embodiments illustrated in the accompanying drawings in which like elements bear like reference numerals.

FIG. 1 is a cross sectional side view of a portable electric grill for household use showing the position of multilayer metal foil insert members inside the grill housing and a depiction of the reflection by said insert members of the radiated heat from the heating element toward the food on the grill surface.

FIG. 2a illustrates a top view of a typical electric heating element system useful in a grill of the present invention.

FIG. 2b is a cross sectional view of a detail of the grill housing and the multilayer metal foil insert member.

FIG. 3 is a cross sectional side view of an embodiment of this invention a having different configuration and grill shape.

FIG. 4 is a cross sectional perspective view illustrating an embodiment of a configuration for installing the multilayer metal foil insert member in a grill cover.

DESCRIPTION OF THE INVENTION

The portable household electric grills for utilizing the present invention are well known in the art. As discussed above, it is also well known in the art the problems existing with the limited heating output of the heating elements operated on a household circuit of 110–120 volts at a maximum of 15 amps. The present invention provides improved efficiency of such electric grills by providing the combination of such a grill with a multilayer metal foil insert in the cover or top of the electric grill and preferable also in the bottom portion of the electric grill. Numerous advantages are achieved through the use of the multilayer metal foil inserts according to this invention, including increased cooking temperatures, enabling self-cleaning temperatures, enabling larger grill cooking surface area for a given heating element, e.g., 1650 Watt, and cooler outside surface temperatures of the grill housing. The latter advantage can provide additional efficiency in manufacturing of grills in that the outside metal portion of the electric grill will not be subjected to high temperatures due to the insulation value of the multilayer metal foil insert which insulates the grill housing from the heating element and lowers the outside temperature of the grill housing. Consequently, the outside portion of the grill housing need not be baked enamel, which is conventional production for many styles of grills. Utilizing the multilayer metal foil insert members according to the present invention enables the production of electric grills with a powder coating exterior rather than a porcelain enamel exterior. The lower exterior operating temperatures of the grill housing also provides a potentially safer product by reducing the potential of severe burn injury in case of accidental contact with the grill by the operator or a bystander.

The multilayer metal foil insert members utilized according to the present invention comprise at least three metal sheets at least two of which are metal foils each having a thickness of 0.006 inches or less. The multilayer metal foil insert members according to this invention will preferably contain at least three metal foil layers and may contain up to seven, nine or more metal foil layers depending on the insulation and heat reflectivity values desired for a particular grill. The insert members may also comprise one or more metal sheet layer which is about 0.007 inches or thicker, as may be desired to provide increased structural strength for the metal foil insert member in addition to the structural strength provided by metal foil layers. It is generally recognized that metal foil has a thickness of 0.006 inches or less, while metal sheet is thicker than 0.006 inches. The additional thicker metal sheet layer can be on the exterior of the multilayer metal foil member or may be an internal layer for structural strength, depending on the design selected by one skilled in the art following the disclosure of this invention.

The reflectivity of the external sheet of the multilayer metal foil insert members is important for the reflectivity values desired to reflect the radiated heat from the heating element back towards the food present on the grill surface. Therefore, the surface reflectivity properties of the metal foil or metal sheet layer can be selected accordingly. It is also important that other layers in the multilayer metal foil insert member provide appropriate reflectivity to also assist in reflecting the heat radiated between layers so that the heat can be radiated and focused back inside the grill towards the food on the grill surface. This is particularly important where the inside metal foil or metal sheet layer which is closest to the grill surface is either selected with a dark or black surface or the surface becomes dark or black with use in the grill. The dark or black surface enables the inside foil or sheet layer closest to the food to absorb heat and effectively radiate heat back toward the food. It is important for best performance of the insert member that the second layer behind the inside layer be reflective so that the heat radiated from the inside layer toward the second layer is reflected back toward the inside layer, which will in turn radiate the heat back inside the grill toward the food on the grill surface. It is a further important aspect for best performance of the insert member that each internal layer be reflective to maximize the direction of radiated heat inward toward the inside layer of the insert member facing the grill surface.

The number of layers and the dimension of the gaps between the layers of the multilayer metal foil insert members are also a matter of selection by one skilled in the art following the present disclosure. A preferred embodiment for providing gaps between the metal foil layers is to emboss the metal foil layers prior to assembly shaping and cutting into the multilayer insert member adapted for a particular grill. The embossments or bumps on the individual foil layers provide the separation and gaps between the layers which in turn provides the insulation value for containing the heat within the grill and providing for a cooler exterior grill temperature. Other structures may be used to provide the desired gaps between the metal foil layers, such as crinkling the metal foils or providing spacers, such as a metal mesh layer, between continuous or discontinuous metal foil layers. The resulting gaps between the layers can be selected to be the size and distance to provide the insulation desired for the appropriate grill design. In general, it is desired to provide gaps between the layers in the range of about 0.005 to about 0.070 inches, preferably between about 0.010 and 0.050 inches. The overall thickness of the multilayer metal foil insert of this invention will depend on the number of layers employed and the size of the gaps between layers, but will be at least about 0.030 inches. Preferably, a 5 to 7 layer insert member will be about 0.050 to about 0.3 or 0.4 inches in overall thickness. Obviously, a particular insert member can have any desired total thickness provided by the number of layers and spacing between the layers to provide the desired performance in a particular grill design. Also, it will be apparent that a particular insert member according to this invention can have varying thickness over its area, as well as different number of layers and height of gaps between layers in different portions or areas of the insert member.

As disclosed above, the multilayer metal foil insert members are designed and shaped for a particular grill with the objective of providing efficient reflection angles for reflecting the radiated heat from the heating element and focusing the radiated heat back toward the grill cooking surface and toward the food present on the grill surface. Whether the grill housing shape is of a kettle or dome shape or is a rectangular elongated shape, the multilayer metal foil insert members can be shaped and designed to have arcuate shapes or faceted shapes which are selected in curvature, size and angular disposition to efficiently reflect and distribute the radiated heat toward the grill cooking surface and consequently toward the food present on the grill cooking surface. This selection of areas and angles and shapes of the insert will be different for each grill design, depending on heating element shape and layout and the grill cooking surface size and shape. The insert member can be formed to accommodate all general grill housing shapes. However, it will be apparent to one skilled in the art following this disclosure that, regardless of the exterior shape of the electric grill housing, the multilayer metal foil insert members can be shaped and positioned inside the grill housing relative to the heating element and the grill cooking surface to maximize not only the reflection of the radiated heat back toward the grill cooking surface and food on the grill surface but also to achieve uniform distribution of the reflected radiated heat across the grill cooking surface to thereby help eliminate hot spots which may tend to result from a particular heating element design or shape.

It should be noted that due to the efficiency provided by the multilayer metal foil insert members of this invention, it will be practical to have a greater distance between the grill surface, i.e., the food on the grill surface, and the electric heating element than conventionally used in such electric grills. This will enable one to further eliminate hot spots and achieve more even cooking of the food.

It should also be noted that in some grill designs it may not be necessary or desirable to use metal foils, i.e., having a thickness of 0.006 inches or less. Following the disclosure of this invention the multilayer metal insert members for electric grills may be made of three or more metal sheets having a thickness of greater than 0.006 inches, i.e., about 0.007 inches or more. Selection of such materials to practice the present invention will be determined by desired durability, formability, structural strength and similar considerations. However, it is preferred in the practice of this invention that the multilayer metal insert members contain or comprise at least two metal foil layers due to better performance of reflectivity and insulating values, as well as decreased weight and better economics.

Due to the efficiency of the electric grill provided by this invention, it is preferred that the control switch for the heating element be a variable power or phase control switch. Such variable power control can be a smooth variable power control or can provide variable average power output through on/off power cycles. This is particularly useful to provide full power for heatup, normal grill cooking and self-cleaning cycle and to provide lower power for lower heat output for slow cooking, especially for rotisserie cooking. In such instances, it may be desirable to reduce the power to 500 Watts or even 200 Watts for long period, slow cooking on the grill.

This invention is further described and illustrated by reference to the drawings. FIG. 1 shows a cross section view of an electric grill having a lower housing portion (1) and an upper top or cover portion (2). The grill contains a grill cooking surface (3) supported in lower housing portion (1). FIG. 1 illustrates an electric heating element (4) in cross section positioned underneath the cooking grill (3). FIG. 2a illustrates a typical electric heating element (4) in top view which is connected by connector (5) to variable control (6) which includes conventional chord and plug (7) for connecting to a household electrical outlet.

The grill illustrated in FIG. 1 contains multilayer metal foil inserts (8) supported inside the lower housing (1) and a multilayer metal foil insert (9) supported in the upper cover housing (2). FIG. 2b is a detailed cross section illustrating upper housing (2) and the multilayer metal foil insert (9). A preferred multilayer metal foil insert comprises four layers of embossed metal foil having a thickness of 0.002 inches and a non-embossed or smooth inside layer (13) closest to the food which is preferably a thicker layer such as a 0.006 inch foil or can if desired be a thicker metal sheet such as a 0.010 inch sheet for added structural strength. A preferred structure and method of making the multilayer metal foil insert is illustrated in U.S. Pat. No. 5,011,743, the disclosure of which is incorporated herein by reference. It will be apparent to one skilled in the art that the selection of number of layers the height of and distribution of the embossments for separating the layers of metal foil may be selected by one skilled in the art by following the disclosure herein. Likewise the selection of metal for the multilayer metal foil insert for use in this invention can be selected by one skilled in the art by art. Aluminum foil is particularly preferred due to economy and ease of working. However, in certain applications, stainless steel foil or copper foil may be used.

As illustrated in FIG. 1, the multilayer metal foil inserts (8) and (9) are shaped and positioned inside the grill housings to provide reflection of the radiated heat from heating element (4) toward food (14) on grill surface (3). Depending on the shape of the heating element (4) and the efficiency and optimization desired for reflection for the radiant heat, the shape of the multilayer metal foil insert will be designed to achieve the desired reflection. The number of metal foil layers used and the thickness and separation of each layer likewise will be selected to provide the added radiation reflection as well as the desired insulation value. In a typical kettle shaped or spherical shaped electric grill the multilayer metal foil inserts (8) and (9) can likewise be kettle or spherical shaped to provide the desired reflection of the radiated heat towards the food (14) on grill surface (3). It is also preferred to have the inside surface of the multilayer metal foil inserts (8) and (9) faceted such as with embossments or flat panel sections which not only reflect the radiated heat toward the food but also diffuse or disperse the reflected radiation to more evenly distribute the radiated heat over the grill surface (3) to avoid hot spots which typically occur with electric grills. It may be preferred in some designs and installations to have additional reflector elements such as (16) in the lower portion of the grill and/or (17) in the upper portion of the grill. These reflector elements may be separate single layer reflectors or preferably will be multilayer metal foil members which may be separately supported and installed in the grill or may be molded as an integral part of the main multilayer metal foil inserts (8) or (9), as appropriate. They may be convex as illustrated, flat, faceted, concave or otherwise shaped to distribute the reflected and radiated heat as desired. The upper insert member (17) can conveniently be formed as part of insert member (9). Lower insert member (16) can be utilized as a "flavorizor" or flavor enhancer by providing a hot surface on which grease drippings are vaporized or smoked to provide enhanced flavor for the food. As is apparent from the illustration in FIG. 1, it may be desirable to have different contours of the inside surface of the multilayer metal foil inserts to provide the desired and optimum reflection of the radiated heat for best distribution of the radiated heat for cooking the food.

In FIG. 1, a further feature is illustrated wherein an opening (18) is provided in the bottom portion of the grill housing to provide a path for the excess or non-vaporized grease drippings from food to pass through the opening into a collection pan (19). In this regard, it will be noted that the shape and contour of the interior surface of the multilayer insert (8) and the bottom portion of the grill housing as well as optional insert (16) will be designed to provide a maximum temperature surface on which grease drippings from cooking food (14) can impinge and be smoked or vaporized to provide the desired grill cooking flavors. The surface of these lower insert members can be fluted, grooved, channeled, or otherwise designed for increasing the surface area on which grease drippings can impinge and smoke to flavor the food. The grooves or channels are also designed to collect and direct the excess grease to a collection point. Collection pan (19) provides for the collection and disposition of excess grease and drippings to avoid flare up or fire from excess grease being present.

FIG. 3 illustrates additional features and embodiments of the present invention. FIG. 3 depicts in cross section a rectangular type of electric grill having an angular bottom housing portion (31) and an angular lid or cover (32) hinged to the bottom housing portion (31) at hinge (32'). Grill cooking surface (33) is supported in the lower housing portion (31) along with the electric heating element (34). This embodiment illustrates the design options following the teachings of this invention. For example, in some grill designs, it may be desirable to have multilayer metal foil inserts (38) in the lower portion of the grill to be essentially flat or planer inserts which are designed to optimize the combination of reflection and distribution of radiated heat as well as providing the heated surface on which grease or drippings from the food can impinge and vaporize on the hot surface. While inserts (38) in the lower portion of the grill are flat or planer in this particular embodiment, the multilayer metal foil insert (39) in the upper portion or cover portion (32) of the grill housing can be arcuate shaped or even semi-spherical or dome shaped if that shape and design provides the desired reflection and distribution of radiated heat even for a rectangular shaped grill cooking surface (33). This embodiment in FIG. 3 further illustrates that the multilayer metal foil inserts (38) and (39) need not conform to the shape of the grill housing (31) or (32), respectively. It is understood that the grill cooking surface can be any conventional type of food support from a wire grate, slotted cast iron grate, solid plate, or other desired configuration.

As will be apparent to one skilled in the art following the teachings of this invention, the more important design criteria will be the shape of the multilayer metal foil inserts as well as the distance between the inserts, the electric heating element and the food position on the grill surface. The void space or air space between the multilayer metal foil inserts and the grill housing is generally a less important factor in configuration design. However, it may be expected that with increased distance between the multilayer metal foil insert and the grill housing, the exterior surface of the grill housing may be cooler than if the multilayer metal foil insert is adjacent to or in contact with the interior surface of the grill housing.

Also illustrated in this embodiment is a preferred aspect wherein the multilayer metal foil insert (38) in the lower portion of the grill is positioned at an optimum angle, A. The optimum angle is designed to provide the heated surface on which the grease or drippings from the cooking food can impinge to be vaporized or provide smoking. Angle A is selected not only to provide maximum heating of the upper surface of the multilayer metal foil insert (38) but also to provide an appropriate angle for the excess drippings to flow downward toward the opening and into removable receiving pan (39). It is desired that the angle be established so that the drippings do not move off of the insert and into receiving pan (39) too rapidly before they can be heated to vaporization or smoking temperatures. At the same time, the angle A should not be so small that excess grease or drippings accumulate on the inside surface of insert (38) and result in undesired flareups or grease fires.

It will be apparent to one skilled in the art how to assemble the components illustrated and disclosed herein and how to attach the multilayer metal foil inserts to the grill housing or to fit the multilayer metal foil inserts into the grill housing so they are secure without separate attachments. The multilayer metal sheet or metal foil inserts can be positioned in the grill by one skilled in the art following the disclosure herein. When attachments are needed, they may be conventional clips, clamps, etc. However FIG. 4 illustrates a preferred embodiment for some grill designs and shapes wherein the multilayer metal foil insert can be snapped into position in the grill housing without any need for clips or clamps. In this embodiment, grill lid or cover (42) contains a groove or indentation (45) formed therein and adapted for receiving into groove (45) on the inside of cover (42) a rolled edge portion (46) of the multilayer metal foil insert (49). In such an embodiment, the multilayer metal foil insert (49) is formed with a rolled edge (46) adapted for placement in the recess formed by groove (45). In a preferred embodiment, the insert rolled edge (46) can contain within the rolled edge a stiffening wire or spring member which can provide additional expansive hoop strength to hold the rolled edge (46) in groove (45) and thereby support the multilayer metal foil insert (49) in the lid or cover of the electric grill without using any clamps or clips. It will be apparent from this illustration that similar configurations can be made for rectangular shaped grill lids and for the lower portion of grill housings to receive multilayer metal foil inserts according to this invention.

The following table illustrates some of the preferred embodiments of the multilayer metal foil inserts for grills provided by this invention, where the layer thickness and the gap is in mils (1 mil=0.001 inch=0.025 mm), and where all layers are aluminum:

| Example | Inside Layer | Gap | 2nd Layer | Gap | 3rd Layer | Gap | 4th Layer | Gap | 5th Layer | Gap | 6th Layer | Gap | 7th Layer |
|---|---|---|---|---|---|---|---|---|---|---|---|---|---|
| 1 | 10 | 50 | 2 | 50 | 2 | | | | | | | | |
| 2 | 10 | 50 | 2 | 50 | 2 | 50 | 5 | | | | | | |
| 3 | 10 | 30 | 2 | 30 | 2 | 30 | 2 | 30 | 2 | | | | |
| 4 | 20 | 10 | 2 | 10 | 2 | 10 | 2 | | | | | | |
| 5 | 30 | 10 | 2 | 10 | 2 | 10 | 2 | 10 | 30 | | | | |
| 6 | 10 | 50 | 2 | 50 | 2 | 50 | 2 | 50 | 2 | 50 | 2 | 50 | 10 |
| 7 | 10 | 50 | 2 | 50 | 2 | 50 | 2 | | | | | | |
| 8 | 10 | 5 | 2 | 5 | 2 | 5 | 10 | | | | | | |
| 9 | 10 | 10 | 2 | 10 | 2 | 10 | 2 | | | | | | |
| 10 | 10 | 20 | 2 | 20 | 2 | 20 | 5 | | | | | | |

What is claimed is:

1. An electric cooking device comprising:

a housing including upper and lower housing members;

a cooking surface positioned within the housing;

an electric heating element positioned within the housing for cooking food which has been placed on the cooking surface, the electric heating element operating on a 110–120 volt AC or 220 volt AC residential power supply;

at least one multilayer metal sheet insert positioned in the upper housing member for radiating, and reflecting radiation from the electric heating element to the cooking surface and achieving cooking temperatures of at least 500° F. at the cooking surface;

wherein the combination of a 2400 watt or smaller electric heating element and the at lease one multilayer sheet insert achieve the cooking temperature of at least 500° F. substantially across 200 square inches of the cooking surface; and wherein the multilayer metal sheet insert is positioned within the upper housing member with a standoff distance between the insert and an inside surface of the upper housing member varying across the upper housing member.

2. An electric cooking device comprising:

a housing including upper and lower housing members;

a cooking surface positioned within the housing;

an electric heating element positioned within the housing for cooking food which has been placed on the cooking surface, the electric heating element operating on a 110–120 volt AC or 220 volt AC residential power supply;

at least one multilayer metal sheet insert positioned in the upper housing member for radiating, and reflecting radiation from the electric heating element to the cooking surface and achieving cooking temperatures of at least 500° F. at the cooking surface, wherein the combination of a 2400 watt or smaller electric heating element and the at least one multilayer sheet insert achieve the cooking temperature of at least 500° F. substantially across 200 square inches of the cooking surfact; and wherein the at least one multilayer metal sheet insert includes a rolled edge which snaps into a corresponding groove in the upper housing member.

3. An electric cooking device comprising:

a housing including an upper and lower housing members;

a cooking surface positioned within the housing;

an electric heating clement positioned within the housing for cooking food which has been placed on the cooking surface; and at least one multilayer metal sheet insert positioned within the upper housing member with a standoff distance between the insert and an inside surface of the upper housing member varying across the upper housing member, the multilayer metal sheet insert radiating and reflecting radiation from the electric heating element to the cooking surface.

4. The electric cooking device according to claim 3, wherein, the electric heating element operates on a 110–120 volt AC or 220 volt AC residential power supply.

5. The electric cooking device according to claim 3, wherein, the at least one multilayer metal sheet insert achieves cooking temperatures of at least 500° F. at the cooking surface.

6. The electric cooking device according to claim 3, wherein the combination of a 2400 watt or smaller electric heating element and the at least one multilayer sheet insert achieve cooking temperatures of at least 500° F. substantially across 200 square inches of the cooking surface.

7. The electric cooking device according to claim 3, wherein the multilayer metal sheet insert includes an inside metal sheet having a thickness greater than 0.006 inches and a plurality of metal foil layers having thicknesses of 0.006 inches or less.

8. The electric cooking device according to claim 7, wherein the metal foil layers are embossed to create insulating gaps between successive layers of the multilayer metal foil insert.

9. The electric cooking device according to claim 3, wherein the multilayer metal sheet insert includes a rolled edge which snaps into a corresponding groove in the upper housing member.

10. The electric cooking device according to claim 3, further comprising at least one additional multilayer foil insert positioned in the lower housing member for absorbing, radiating, and reflecting radiation from the electric heating element to the cooking surface.

11. The electric cooking device according to claim 10, wherein the additional multilayer metal foil insert positioned in the lower housing member includes an opening for collecting drippings from food positioned on the cooking surface.

12. The electric cooking device according to claim 11, wherein the additional multilayer foil is arranged at an angle which provides a hot surface on which drippings impinge causing smoking of the food and along which excess drippings drain through the opening.

13. An electric cooking device comprising:

a housing including and upper and lower housing members;

a cooking surface positioned within the housing;

an electric heating element positioned within the housing for cooking food which has been placed on the cooking surface; and at least one multilayer metal sheet insert positioned in the upper housing member for radiating and reflecting radiation from the electric heating clement to the cooking surface, the at least one multilayer metal sheet insert including a rolled edge which snaps into a corresponding groove in the upper housing member.

14. The electric cooking device according to claim 13, wherein, the electric heating clement operates on a 110–120 volt AC or 220 volt AC residential power supply.

15. The electric cooking device according to claim 13, wherein, the at least one multilayer metal sheet insert achieves cooking temperatures of at least 500 degrees F at the cooking surface.

16. The electric cooking device according to claim 13, wherein the combination of a 2400 watt or smaller electric heating element and the at least one multilayer sheet insert achieve cooking temperatures of at least 500° F. substantially across 200 square inches of the cooking surface.

17. The electric cooking device according to claim 13, wherein the multilayer metal sheet insert includes an inside metal sheet having a thickness greater than 0.006 inches and a plurality of metal foil layers having thicknesses of 0.006 inches or less.

18. The electric cooking device according to claim 7, wherein the metal foil layers are embossed to create insulating gaps between successive layers of the multilayer metal foil insert.

19. The electric cooking device according to claim 13, further comprising at least one additional multilayer foil insert positioned in the lower housing member for absorbing, radiating, and reflecting radiation from the electric heating element to the cooking surface.

20. The electric cooking device according to claim 19, wherein the additional multilayer metal foil insert positioned in the lower housing member includes an opening for collecting drippings from food positioned on the cooking surface.

21. The electric cooking device according to claim 20, wherein the additional multilayer foil is arranged at an angle which provides a hot surface on which drippings impinge causing smoking of the food and along which excess drippings drain through the opening.

* * * * *

UNITED STATES PATENT AND TRADEMARK OFFICE
CERTIFICATE OF CORRECTION

PATENT NO. : 6,104,004
DATED : August 15, 2000
INVENTOR(S) : Ragland, Scott W. et al.

It is certified that error appears in the above-identified patent and that said Letters Patent is hereby corrected as shown below:

<u>Title page,</u>
Item [63], Related U.S. Application Data, please insert:
-- [63] Provisional Application No. 60/042,992, filed on April 10, 1997 --

Signed and Sealed this

Twenty-seventh Day of July, 2004

JON W. DUDAS
*Acting Director of the United States Patent and Trademark Office*